3,201,498
COMPOSITIONS OF POLYETHYLENE AND ETHYLENE/ETHYLACRYLATE COPOLYMERS FOR IMPROVED HEAT SEALABILITY
Marion O. Brunson and William D. McGillen, Kingsport, Tenn., assignors to Eastman Kodak Company, Rochester, N.Y., a corporation of New Jersey
No Drawing. Filed May 2, 1962, Ser. No. 192,010
6 Claims. (Cl. 260—897)

This invention concerns polymeric compositions for applying to various substrates to provide heat sealability.

It is very often desirable to provide heat-seal applications for substrates such as paper, cellulose ester sheeting, regenerated cellulose sheeting, and the like. These coatings provide a simple means of heat sealing packages which are more easily applied than cements or solvent-type applications since only a heated anvil or other surface need be used to apply the heat to the area to be sealed. However, the particular type of coating which is applied to the substrate must have characteristics which are suitable for the purpose. For instance, the melting temperature at which the heat-sealing coatings apply must be low enough to be applied without damaging the substrate itself but must be high enough to avoid having the seal come apart under normal conditions to which the packages might be submitted.

A typical heat-sealing coating used in the past has been a paraffin wax applied to a substrate such as paper and the like. However, paraffin wax is susceptible to blocking when a certain amount of pressure is applied and also subject to blocking under relatively warm weather conditions. Attempts have been made to modify various hydrocarbon resins and the like to provide heat-seal properties, but in some instances the modified polymeric coatings have had disadvantages such as a high degree of color, poor heat stability and poor aging characteristics.

There has been a need for a heat-seal composition which would be inert with respect to foodstuffs, which would have good physical appearance, good adhesion, and high stability.

We have discovered the combination of ethylene/ethylacrylate copolymers blended with polyethylene which provide superior heat-sealing characteristics.

One object of this invention is to provide a composition of polyethylene and ethylene/ethylacrylate copolymers having improved heat sealability. A further object is to provide a package comprising a polymeric sheeting having thereon a heat-sealable coating providing a tight seal obtained by heating the coated ends together. Further object is to provide a heat-sealable coating which can be readily applied using roll coating equipment and which may be prepared economically.

The above objects are obtained by combining two polymeric materials in a simple two-component blend consisting of polyethylene and a copolymer of ethylene and ethylacrylate. The preferred composition is as follows:

| Material: | Parts by weight, percent |
|---|---|
| Polyethylene | 60–95 |
| Ethylene/ethylacrylate copolymer | 5–40 |

These compositions are prepared by melting the polyethylene in a suitable container, agitating with high sheer and slowly adding the ethylene/ethylacrylate copolymer. The temperature of blending should be between about 250 and 350° F., and the time will be dependent upon the melt viscosity of the polyethylene and the percentage of ethylene/ethylacrylate copolymer. Blending is continued until a homogeneous mixture is obtained.

The polyethylene portion of the composition should be a low-molecular weight, low-density polyethylene having the following characteristics:

| Molecular weight | 1,500–10,000. |
|---|---|
| Density | 0.87–0.95. |
| Melt viscosity at 150° C. | Less than 20,000 cps. |

The ethylene/ethylacrylate copolymer preferred in this invention has a melt index of 18, a density of 0.929 and an ethylacrylate content of approximately 15 percent. A typical material may be purchased under the trade name of Zetafin 70, marketed by the Dow Chemical Company. However, the useful ethylene/ethylacrylate copolymers include materials prepared by the copolymerization of ethylene and ethylacrylate at pressures of approximately 15,000 p.s.i. and temperatures between 150 and 250° C. in the presence of a suitable catalyst. Some of the properties of the ethylene/ethylacrylate copolymer are as follows:

| Melt index | 15–100 |
|---|---|
| Density | .915–.95 |
| Ethylacrylate content percent | 5–30 |

In the preparation and application of these hot melt compositions, other products such as polyterpene resins, paraffin wax, hydrocarbon resins, rosin and its derivatives and slip agents such as oleamide, may be added to produce special effects provided that these additives are not present in an amount more than 10 percent of the total composition. In our preferred embodiment, only the two components described above, polyethylene and the ethylene/ethylacrylate copolymer are used.

The coating materials listed above are suitable for application to various substrates. For instance, paper, cellophane, aluminum foil, cellulose acetate, cellulose acetate butyrate, polyesters, polyvinyl chloride, polyvinylidene chloride, polystyrene, acrylic resins, phenolic resins, polyolefins, and other types of surfaces may be coated with this hot melt composition to provide heat sealability. In addition to coating for heat-seal purposes, these compositions may also be used for laminating any combination of the aforementioned substrates. These hot melt compositions find special use in the general packaging field for sealing of folding cartons and for heat-seal labels.

The method of coating is by the hot melt technique which is well known in the art. The hot melt may be applied by a kiss roll, by immersion, or by hopper, depending upon the desired result. It will be appreciated that the polyethylene which is described above may be of the degraded or oxidized type as well as prepared by direct polymerization to a low-molecular weight polyethylene. The thickness of the coating may be from ¼ mil to 2 mils, a particular advantage being that a very thin coating may be used for heat sealability as compared to previously known material such as paraffin and the like. The adhesiveness of the coating is such that a coating of almost molecular thickness may be used to provide a measure of sealability further providing economic operation of this invention. It will also be appreciated that the coating may be applied in strips or in discontinuous patterns to provide sealability for predetermined areas.

The following examples are intended to illustrate our invention but not to limit it in any way:

*Example 1*

A blend containing 80 percent polyethylene having a molecular weight of 3000 prepared from low-density polyethylene and 20 percent of an ethylene/ethylacrylate copolymer having a melt index of 18, a density of 0.929 and approximately 15 percent ethylacrylate was prepared and applied to 40-pound bleached kraft paper on a laboratory single-roll kiss coater at the rate of 10 pounds per 3000 square feet. This coated paper was then heat-sealed on a conventional heated jaw sealer at temperatures between 200 and 300° F., pressure between 2 and 40 p.s.i. and dwell times between 1/10 and 2 seconds. The resulting seals were of fiber-tearing quality. Similar paper coated with the same polyethylene containing no copolymer would not heat-seal. The remaining roll of paper was checked for blocking, color, odor, etc., and showed satisfactory qualities.

*Example 2*

A hot melt composition containing 70 percent polyethylene as described in Example 1 and 30 percent ethylene/ethylacrylate copolymer used in Example 1 was prepared in coating on paper as in Example 1. The resulting paper exhibited improved heat-seal characteristics but the composition was somewhat higher in viscosity than that used in Example 1.

*Example 3*

A hot melt composition was prepared containing 60 percent polyethylene, 20 percent ethylene/ethylacrylate copolymer both as polymeric materials, as described in Example 1, and 20 percent 140° F. average melting point paraffin. The resulting coating was compared to Examples 1 and 2 and found to be inferior in heat-seal qualities and in blocking characteristics.

*Example 4*

A hot melt composition containing 90 percent low-density polyethylene having a molecular weight of 7000 and 10 percent ethylene/ethylacrylate copolymer as described in Example 1 was prepared. The resulting composition was applied to paper, as in Example 1, and later tested for heat-sealability. The resulting heat seals were equivalent to those obtained in Example 1.

We claim:
1. A hot melt composition containing 60–95 percent polyethylene having a molecular weight of 1,500–10,000, a density of 0.87 to 0.95 and a melt viscosity at 150° C. of less than 20,000 cps. and 5–40 percent ethylene/ethylacrylate copolymer having a melt index of 15–100, a density of .915–.95 and an ethylacrylate content of 5–30 percent.

2. A heat-sealable material comprising a substrate having thereon a heat-sealable composition as described in claim 1.

3. A hot melt composition containing 60–95 percent polyethylene having a molecular weight of 1,500–10,000, a density of 0.87 to 0.95 and a melt viscosity at 150° C. of less than 20,000 cps. and 5–40 percent ethylene/ethylacrylate copolymer having a melt index of 18, a density of .929 and an ethylacrylate content of 15 percent.

4. A heat-sealable material comprising a substrate having thereon a heat-sealable composition as described in claim 3.

5. A hot melt composition containing 80 percent polyethylene having a molecular weight of 3,000, a density of 0.87 to 0.95 and a melt viscosity at 150° C. of less than 20,000 cps. and 20 percent ethylene/ethylacrylate copolymer having a melt index of 18, a density of .929 and an ethylacrylate content of 15 percent.

6. A heat-sealable material comprising a substrate having thereon a heat-sealable composition as described in claim 5.

References Cited by the Examiner

UNITED STATES PATENTS

| | | | |
|---|---|---|---|
| 2,868,762 | 1/59 | Oakes | 260—897 |
| 2,953,541 | 9/60 | Percha et al. | 260—897 |

MURRAY TILLMAN, *Primary Examiner.*

LEON J. BERCOVITZ, *Examiner.*